(12) United States Patent
Mehran et al.

(10) Patent No.: US 11,956,053 B2
(45) Date of Patent: Apr. 9, 2024

(54) WIRELESS TELECOMMUNICATIONS NETWORK

(71) Applicant: BRITISH TELECOMMUNICATIONS PUBLIC LIMITED COMPANY, London (GB)

(72) Inventors: Farhad Mehran, London (GB); Richard Mackenzie, London (GB)

(73) Assignee: British Telecommunications Public Limited Company (GB)

(*) Notice: Subject to any disclaimer, the term of this patent is extended or adjusted under 35 U.S.C. 154(b) by 0 days.

(21) Appl. No.: 18/254,431

(22) PCT Filed: Oct. 12, 2021

(86) PCT No.: PCT/EP2021/078177
§ 371 (c)(1),
(2) Date: May 25, 2023

(87) PCT Pub. No.: WO2022/111903
PCT Pub. Date: Jun. 2, 2022

(65) Prior Publication Data
US 2023/0344501 A1 Oct. 26, 2023

(30) Foreign Application Priority Data
Nov. 30, 2020 (GB) ..................................... 2018792

(51) Int. Cl.
*H04W 52/28* (2009.01)
*H04B 7/06* (2006.01)
*H04W 52/14* (2009.01)

(52) U.S. Cl.
CPC ........ *H04B 7/0695* (2013.01); *H04W 52/143* (2013.01); *H04W 52/283* (2013.01)

(58) Field of Classification Search
CPC .............. H04B 7/0695; H04W 52/143; H04W 52/283; H04W 12/03; H04W 52/367;
(Continued)

(56) References Cited

U.S. PATENT DOCUMENTS 8,767,572 B1 7/2014 Vargantwar et al.
9,590,744 B2 3/2017 Calin et al.
(Continued)

FOREIGN PATENT DOCUMENTS

CN 110650479 A 1/2020
CN 110996254 A 4/2020
(Continued)

OTHER PUBLICATIONS

Chiarabiglio L., et al., "Planning 5G Networks Under EMF Constraints," State of the Art and Vision, IEEE Access, Aug. 8, 2018, vol. 6, 17 pages.
(Continued)

*Primary Examiner* — Kenneth T Lam
(74) *Attorney, Agent, or Firm* — Pranger Law PC (57) ABSTRACT

A network node for a wireless telecommunications network, and a method of operating a network node, are disclosed. The wireless telecommunications network includes a first access point having a first transmitter configured to transmit in a first coverage area, and the method can include receiving, from a sensor, data indicative of an object within the first coverage area of the first access point's first transmitter; determining, from the data, that the object is an illegitimate user; and, in response, causing a modification of the first access point so that the object cannot successfully receive a transmission from the first transmitter.

12 Claims, 9 Drawing Sheets

(58) Field of Classification Search
CPC ..... H04W 12/63; H04W 16/28; H04W 88/08; B64U 10/00

See application file for complete search history.

(56) References Cited

U.S. PATENT DOCUMENTS

| | | | |
|---|---|---|---|
| 10,044,926 | B2 | 8/2018 | Galor et al. |
| 10,991,242 | B2* | 4/2021 | Taylor ..................... H04Q 9/00 |
| 2003/0202662 | A1 | 10/2003 | McBrearty et al. |
| 2004/0017312 | A1* | 1/2004 | Anderson ............... G01S 5/021 342/457 |
| 2012/0022719 | A1* | 1/2012 | Matos ................ B64D 45/0031 701/2 |
| 2014/0329485 | A1 | 11/2014 | Calin et al. |
| 2015/0138992 | A1 | 5/2015 | Jover |
| 2018/0138958 | A1 | 5/2018 | Asplund et al. |
| 2018/0160377 | A1* | 6/2018 | Abramsky .......... H04W 52/283 |
| 2019/0132804 | A1 | 5/2019 | Hong et al. |
| 2020/0077257 | A1 | 3/2020 | Ekambaram et al. |

FOREIGN PATENT DOCUMENTS

| | | |
|---|---|---|
| CN | 109151938 B | 11/2020 |
| CN | 110996254 B | 2/2021 |
| EP | 2814292 A1 | 12/2014 |
| EP | 2833558 B1 | 12/2015 |
| EP | 3373466 A1 | 9/2018 |
| EP | 2814292 B1 | 5/2019 |
| EP | 3518587 A1 | 7/2019 |
| EP | 3739781 A1 | 11/2020 |
| EP | 3764564 A1 | 1/2021 |
| EP | 3373466 B1 | 7/2021 |
| GB | 2559556 A | 8/2018 |
| WO | WO-2017052923 A1 | 3/2017 |
| WO | WO-2017198293 A1 | 11/2017 |
| WO | WO-2018134629 A1 | 7/2018 |
| WO | WO-2020065384 A1 | 4/2020 |

OTHER PUBLICATIONS

Combined search and Examination Report for Great Britain Application No. 2001528.5, dated Jun. 24, 2020, 7 pages.
Combined search and Examination Report for Great Britain Application No. 2001529.3, dated Jun. 24, 2020, 7 pages.
Combined Search and Examination Report under Sections 17 and 18(3) for Great Britain Application No. 2018792.8, dated Apr. 26, 2021, 8 pages.
Combined Search and Examination Report under Sections 17 and 18(3) for Great Britain Application No. 2111494.7, dated Jan. 31, 2022, 9 pages.
Combined Search and Examination Report under Sections 17 and 18(3) for Great Britain Application No. 2114573.5, dated Nov. 26, 2021, 4 pages.
Docomo/Telematica Instituut: "Mobility Management Threats in S3-06564," 3GPP Draft; MMthreats-LTE_SAE_Security-Rationale, 3rd Generation Partnership Project (3GPP) Mobile Competence Centre; 650, Route Des Lucioles Cedex ; France vol. SA WG3, No. Ashburn; Oct. 24, 2006, Oct. 24, 2006 (Oct. 24, 2006), XP050279150, [retrieved on Oct. 24, 2006], 9 pages.

European Search Report, Application No. 20155636.2, dated Apr. 22, 2020, 10 pages.
European Search Report, Application No. 20155637.0, dated Apr. 28, 2020, 10 pages.
Garg R., "Learning to Predict Depth on the Pixel 3 Phones," Google AI Blog, Nov. 29, 2018, 4 pages.
International Commission on Non-Ionizing Radiation Protection, "ICNIRP Guidelines for Limiting Exposure to Time-Varying Electric, Magnetic and Electromagnetic Fields (Up to 300 GHZ)," Health Physics, Jan. 1, 1999, vol. 74(4), 38 pages.
International Preliminary Report on Patentability for International Application No. PCT/EP2021/078177, dated Jan. 4, 2023, 15 pages.
International Preliminary Report on Patentability for PCT/EP2020/085463, dated Aug. 18, 2022,11 pages.
International Search Report and Written Opinion for Application No. PCT/EP2020/085463, dated Feb. 24, 2021, 15 pages.
International Search Report and Written Opinion for Application No. PCT/EP2021/078177, dated Dec. 23, 2021, 14 pages.
International Search Report and Written Opinion for Application No. PCT/EP2022/068967, dated Oct. 21, 2022, 14 pages.
Ismail M S et al: "Forward-Link Frequency Reuse Efficiency of Power Controlled CDMA Cellular System," Personal, Indoor and Mobile Radio Communications, Sep. 27, 1995, vol. 2, pp. 441-445.
Itoh K-I., et al., "Performance of Handoff Algorithm Based on Distance and RSSI Measurements", IEEE Transactions on Vehicular Technology, Nov. 2002, vol. 51, No. 6, pp. 1460-1468.
Jang J., et al., "Depth Map Generation Using a Single Image Sensor With Phase Masks," Optical Society of America, 2016, vol. 24, No. 12, 11 pages.
Khan R., et al., "Recent Advancements in User Effect Mitigation for Mobile Terminal Antennas: A Review," IEEE Transactions on Electromagnetic Compatibility, vol. 61, No. 1, Feb. 2019, pp. 279-287.
Kyocera Corp: "Coverage Configuration Transition Management for ES Coverage Scenario," 3GPP Draft; R3-132298, 3rd Generation Partnership Project (3GPP), Mobile Competence Centre ; 650, Route Des Lucioles ; F-06921 Sophia-Antipolis Cedex ; France, vol. RAN WG3, No. San Francisco, CA, USA; Nov. 11, 2013-Nov. 15, 2013, Nov. 12, 2013, XP050738315, Retrieved from the Internet: URL: http://www.3gpp.org/ftp/Meetings_3GPP_SYNC/RAN/RAN3/Docs/ [retrieved on Nov. 12, 2013], 5 pages.
Liao C-H., et al., "Eavesdropping Prevention for Heterogeneous Internet of Things Systems," 2018 15th IEEE Annual Consumer Communications & Networking Conference (CCNC), 2018, 2 pages.
Routray S.K., et al., "Quantum Cryptography for IoT: A perspective," International Conference on IoT and Application (ICIOT), 2017, 4 pages.
Wang Y., et al., "Interference Management Based on Power Control and MU-MIMO," Cluster Computing, 2019, vol. 22, 8 pages.
Written Opinion for Application No. PCT/EP2021/078177, dated Oct. 13, 2022, 07 pages.
Wu Q., et al., "Safeguarding Wireless Network with UAVs: A Physical Layer Security Perspective," arXiv:1902.02472v2 [cs.IT], Jul. 24, 2019, 15 pages.
Zhang G., et al., "Securing UAV Communications via Joint Trajectory and Power Control," IEEE Transactions on Wireless Communications, IEEE Services Centre, Piscataway, NJ, US, vol. 18, No. 2, Feb. 1, 2019, XP011710133, ISSN: 1536-1276, DOI:10.1109/TWC.2019.2892461 [retrieved on Feb. 8, 2019], pp. 1376-1389.

* cited by examiner

WIRELESS TELECOMMUNICATIONS NETWORK

PRIORITY CLAIM

The present application is a National Phase entry of PCT Application No. PCT/EP2021/078177, filed Oct. 12, 2021, which claims priority from GB Patent Application No. 2018792.8, filed Nov. 30, 2020, each of which is hereby fully incorporated herein by reference.

TECHNICAL FIELD

The present disclosure relates to a wireless telecommunications network.

BACKGROUND

In wireless telecommunications networks, access points and users communicate using wireless signals which may be intercepted by an eavesdropper. To prevent the eavesdropper from decoding a user's data, an encryption method may be used. Furthermore, wireless networks may be designed so that the wireless signals do not propagate outside a particular area (e.g. outside a building) so that physical access controls may also be used to prevent eavesdroppers from intercepting these signals. This may help prevent unauthorized receipt of user data where an encryption method is not being used or the encryption method has an unpatched or unknown vulnerability. This technique is also particularly relevant to modern wireless telecommunications networks utilizing highly directional phased-array antennas, as the coverage areas of these antennas may be accurately defined. The present inventors have realized that these security techniques relying on coverage area configuration may now be compromised by the use of Unmanned Vehicles (UVs), such as Unmanned Aerial Vehicles (UAVs), which may gain unauthorized physical access to the coverage area of the wireless telecommunications network (that may have previously been inaccessible—such as a rooftop) and may intercept these wireless signals using an on-board User Equipment (UE).

SUMMARY

According to a first aspect of the disclosure, there is provided a method of operating a network node in a wireless telecommunications network, wherein the wireless telecommunications network includes a first access point having a first transmitter configured to transmit in a first coverage area, wherein the first access point serves a legitimate User Equipment (UE), the method comprising receiving, from a sensor, data indicative of an object within the first coverage area of the first access point's first transmitter, the data identifying a location of the object within the first coverage area of the first access point's first transmitter; determining, from the data, that the object is an illegitimate user; and, in response, causing a modification of the first access point so that the object cannot successfully receive a transmission from the first transmitter by reducing a value of signal strength of the transmission from the first transmitter at the object's location to below a signal strength threshold representing a minimum signal strength required to successfully receive the transmission from the first transmitter, and continuing service to the legitimate UE by causing a transfer of the legitimate UE to a second transmitter in the wireless telecommunications network.

Causing the modification of the first access point may also include implementing an encryption technique for the transmission from the first transmitter or switching to a more secure encryption technique for the transmission from the first transmitter.

According to a second aspect of the disclosure, there is provided a method of operating a network node in a wireless telecommunications network, wherein the wireless telecommunications network includes a first access point having a first transmitter configured to transmit in a first coverage area, the method comprising receiving, from a sensor, data indicative of an object within the first coverage area of the first access point's first transmitter; determining, from the data, that the object is an illegitimate user; and, in response, causing a modification of the first access point to implement an encryption technique for the transmission from the first transmitter or to switch to a more secure encryption technique for the transmission from the first transmitter.

The method may further comprise monitoring a location of the object, wherein receiving data indicative of the object is part of the monitoring.

The object may be an Unmanned Vehicle (UV), such as an Unmanned Aerial Vehicle (UAV).

According to a third aspect of the disclosure, there is provided a computer program comprising instructions which, when the program is executed by a computer, cause the computer to carry out the method of the first or second aspects of the disclosure. The computer program may be stored on a computer readable carrier medium.

According to a fourth aspect of the disclosure, there is provided a node for a wireless telecommunications network having a transceiver, memory and processor configured to cooperate to implement the method of the first or second aspects of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

A first embodiment of a wireless telecommunications network of the present disclosure will now be described with reference to FIGS. 1 to 3. In this embodiment, the wireless telecommunications network is a cellular telecommunications network 1 including a first base station 10, second base station 20, an optical camera 30, a beam management node 50, and a first legitimate UE (the term "legitimate" will become clear following review of this description) 60. The first and second base stations 10, 20 are both configured for communications according to a cellular telecommunications protocol, such as the 5th Generation (5G) protocol defined by the 3rd Generation Partnership Project (3GPP). The first and second base stations 10, 20 include backhaul connections to a cellular core network (not shown).

Figure 1:
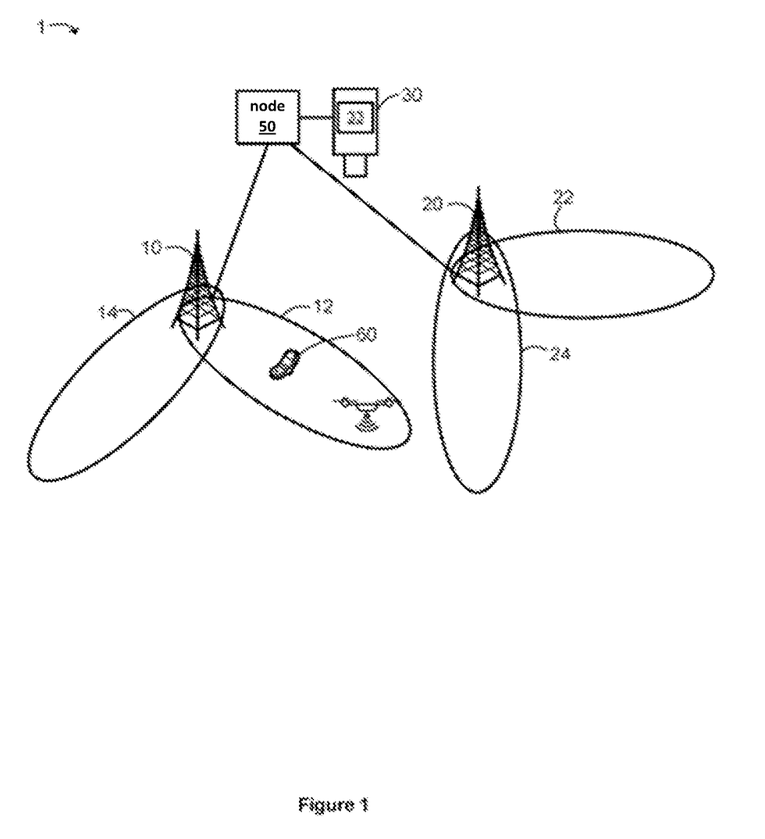
FIG. 1 is a schematic diagram of a cellular telecommunications network of a first embodiment of the present disclosure.

As shown in FIG. 1, the first and second base stations 10, 20 each include a plurality of transceivers that are configured for beamforming, so that distinct beams 12, 14, 22, 24 may be formed to provide voice and/or data service to users within the geographical areas defined by each beam. The first and second base stations 10, 20 may create, reconfigure and remove each beam of their respective sets of beams. One operating parameter of each transceiver of the plurality of transceivers for the first and second base station 10, 20 is the transmission power. Generally, increasing the transmission power of a transceiver increases both the capacity and the range of the transmissions. The signal strength of these transmissions decreases with distance from the transceiver (for example, by an inverse square law for propagation in free space or by some other function in a real-world example) such that each beam has a maximum coverage area outside of which the signal strength is below a signal strength threshold representing a minimum signal strength required for another wireless device to successfully decode these transmissions. The coverage area of each beam is also defined by other transmission parameters, such as its angle. In this embodiment, the first legitimate UE 60 is located within and connected to the first beam of the first base station 10.

FIG. 1 further illustrates an optical camera 30. The optical camera 30 is configured to capture images or video (i.e. a sequence of images) in the visible spectrum (that is, electromagnetic radiation having wavelengths in the range of around 400 to 700 nanometers). The optical camera 30 is in a fixed location and is positioned so as to capture images or video of a geographical area that includes the first and second base stations 10, 20. The optical camera 30 includes a processor 33 for processing captured images, which will be explained in more detail below. The optical camera 30 also includes a Global Navigation Satellite System (GNSS) module, such as the Global Positioning System (GPS) module, to determine the coordinates of its location.

Figure 2:
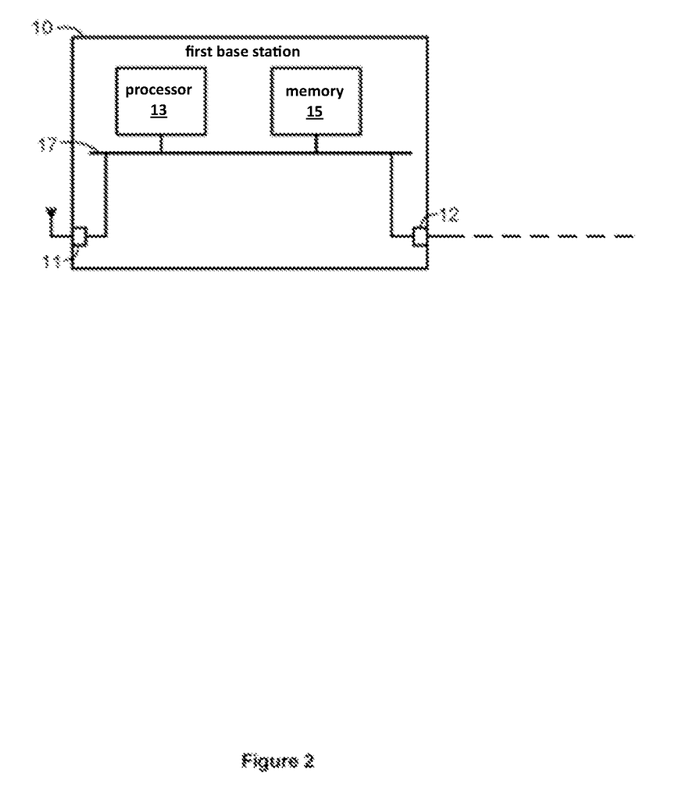
FIG. 2 is a schematic diagram of a first base station of the network of FIG. 1.
Figure 3:
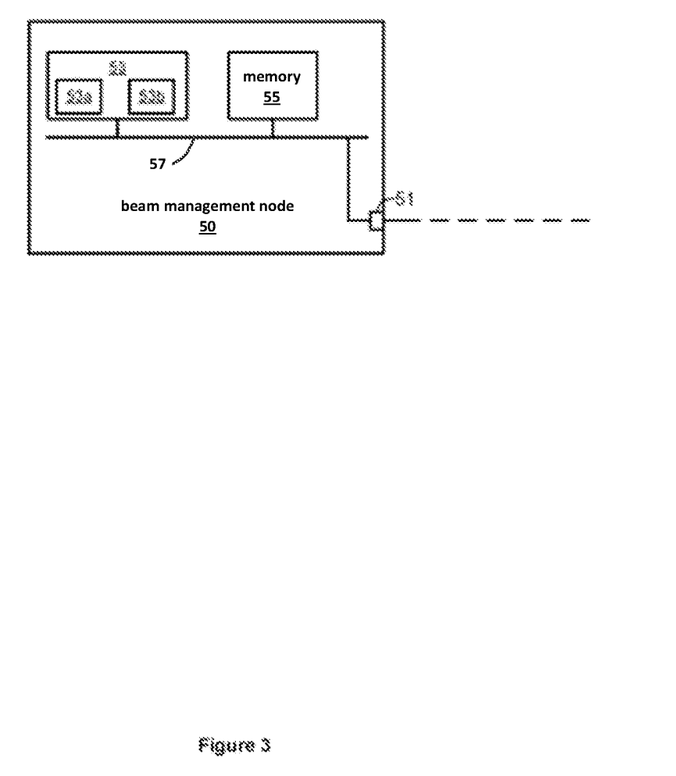
FIG. 3 is a schematic diagram of a beam management node of the network of FIG. 1.

The first base station 10 is shown in more detail in FIG. 2. The first base station includes a first communications interface 11 (connectable to an antenna), a second communications interface 12 (connectable to a core network via a backhaul connection), a processor 13 for processing wireless signals received/transmitted via the first and second communications interfaces, and memory 15, all connected via bus 17. The second base station 20 is substantially the same as the first base station 10.

The cellular telecommunications network 1 further includes a beam management node 50, residing in the core network and connected to both the first and second base stations 10, 20. As shown in more detail in FIG. 3, the beam management node 50 includes a communications interface 51, a processor 53 and memory 55, all connected via bus 57. Memory 55 includes a database of visual training data for a computer vision learning agent. In this embodiment, memory 55 includes a database storing:

1. An identifier for a type of object (e.g. an Unmanned Aerial Vehicle, UAV);
2. One or more training images of that type of object (e.g. including a number of variations of that type of object, such as different UAV models and images at different angles); and
3. An action identifier (e.g. investigate, no investigation necessary) for that type of object.

The database may be periodically updated with new images.

The action identifier may be used to tailor the response of the beam management node 50 to different types of object that may be detected in the geographical area and their corresponding risk of being an eavesdropper. For example, a UAV may be high risk and therefore warrant further investigation to determine whether the UAV is a legitimate or an illegitimate entity, whereas an animal may be zero risk and so no further investigation is necessary.

In this embodiment, the processor 53 of beam management node 50 implements a computer vision process by a learning agent 53a and an inference agent 53b. The learning agent 53a is configured to train a machine learning algorithm, in this case a classification model, based on the visual training data in the database. The classification model maps between each training image from the database and the corresponding identifier for that type of object. The trained classification model may then be used by the inference agent 53b.

The learning agent 53a performs periodic learning operations to update the classification algorithm, thus adapting to any new images of objects.

The inference agent 53b uses the trained classification model in order to map between an input image (e.g. an image captured by the optical camera 30) and an object identifier (and therefore the action identifier associated with that object identifier).

Figure 4:
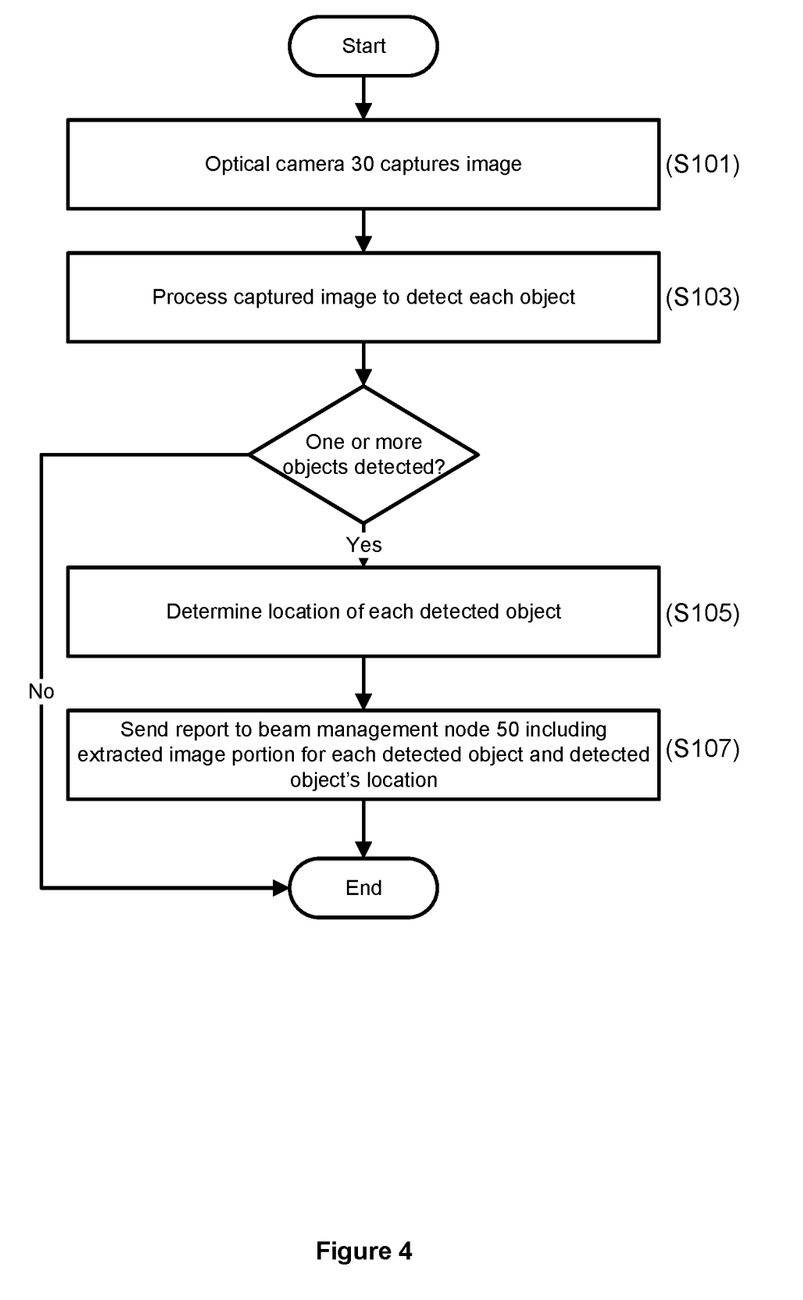
FIG. 4 is a flow diagram of a process implemented by an optical camera in a first embodiment of a method of the present disclosure.
Figure 6:
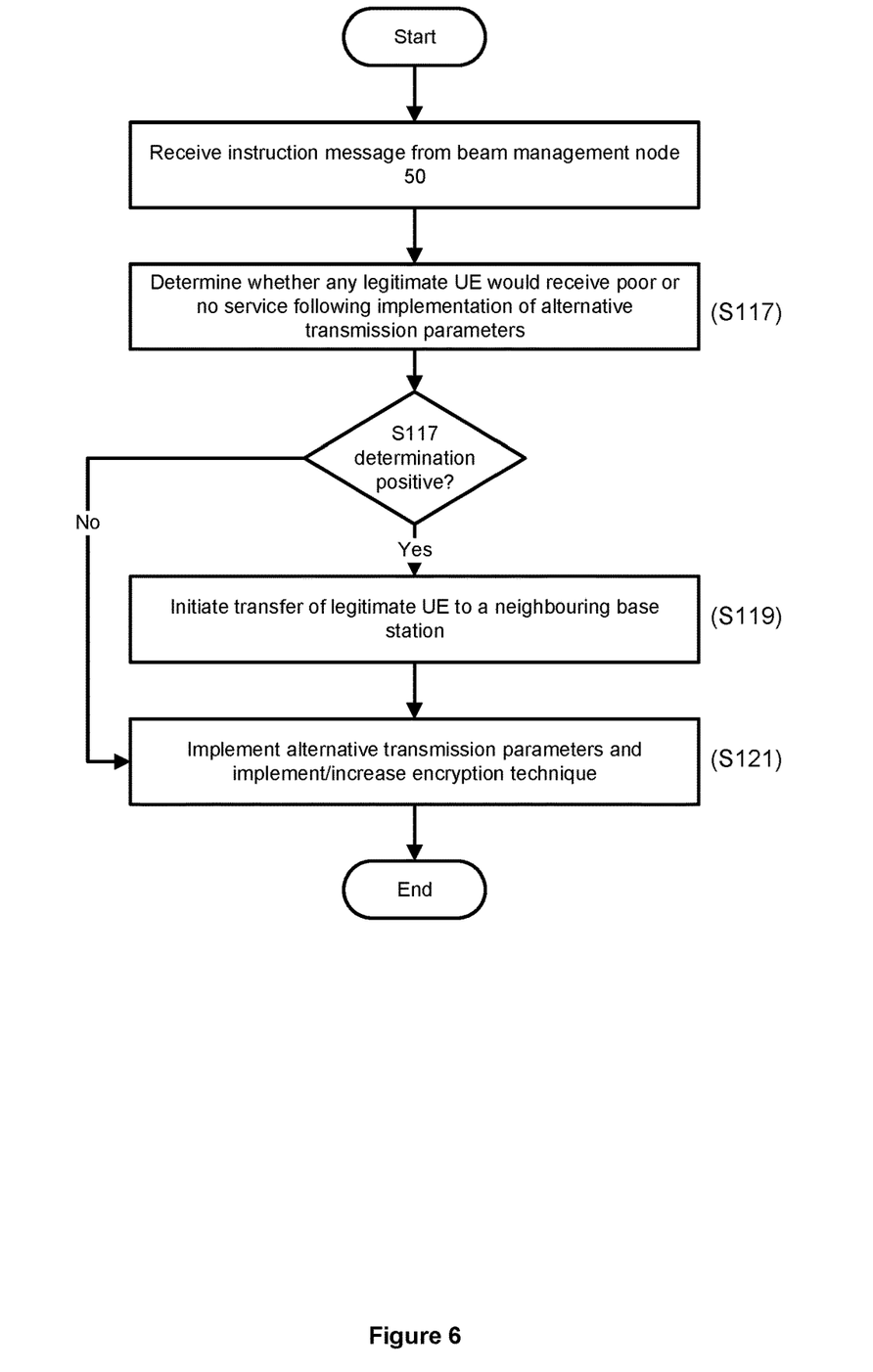
FIG. 6 is a flow diagram of a process implemented by the first base station in the first embodiment of the method of the present disclosure.
Figure 7:
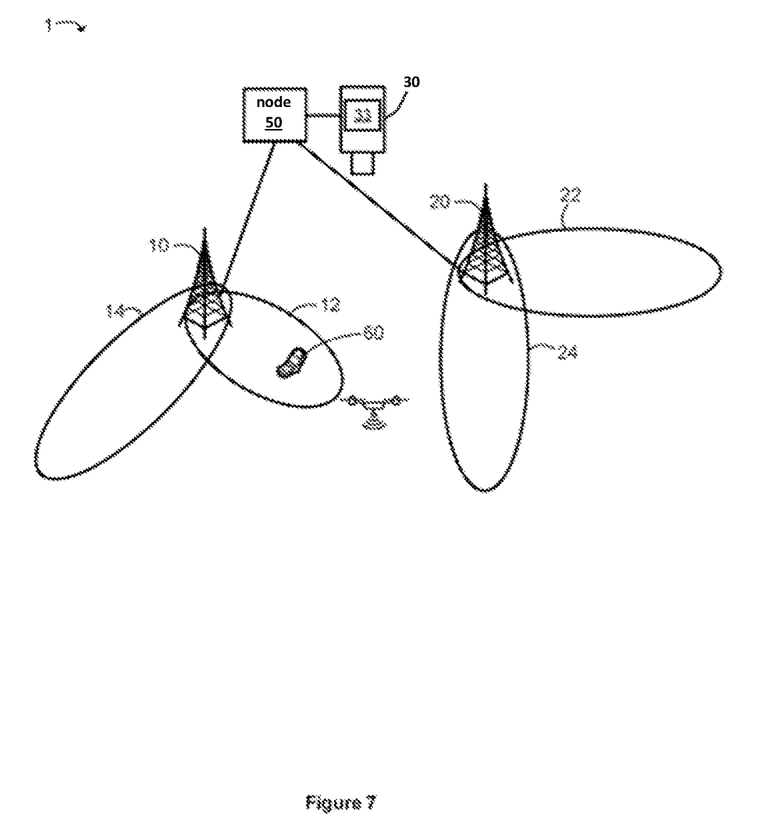
FIG. 7 is a schematic diagram of the network of FIG. 1 following implementation of the method of FIGS. 4 to 6.

A first embodiment of a method of the present disclosure will now be described with reference to FIGS. 1 and 4 to 7. FIG. 1 illustrates the network 1 in an initial state, FIGS. 4 to 6 are flow diagrams of processes of this first embodiment of the method of the present disclosure implemented by the optical camera 30, beam management node 50 and first base station 10 respectively, and FIG. 7 illustrates the network 1 in a final state following implementation of this first embodiment of the method of the present disclosure.

At S101, the optical camera 30 captures an image of the geographical region (that includes the first and second base station 10, 20). At S103, the optical camera's processor 33 processes the image to detect each object in the image. If no objects are detected, then the process ends or loops back to S101. In this example, the image includes a first detected object—the legitimate UE 60, and a second detected object—a UAV. At S105, the optical camera's processor 33 determines the location of each detected object. In this embodiment, this is achieved using a phase detection focus technique to determine the distance between the optical camera 30 and each detected object, and further using the optical camera's location (captured by GPS). Suitable phase detection techniques include those described in International Patent Application Publication No. WO2017/052923A1, U.S. patent Ser. No. 10/044,926, and the paper, "Depth map generation using a single image sensor with phase masks", Jinbeum Jang et al., Image Processing and Intelligent System Laboratory Graduate School of Advanced Imaging Science and Film.

At S107, the optical camera sends a report to the beam management node 50 including, for each detected object, an extracted image portion of that detected object (being a portion of the captured image that includes the detected object), and the detected object's location (determined at S105).

Figure 5:
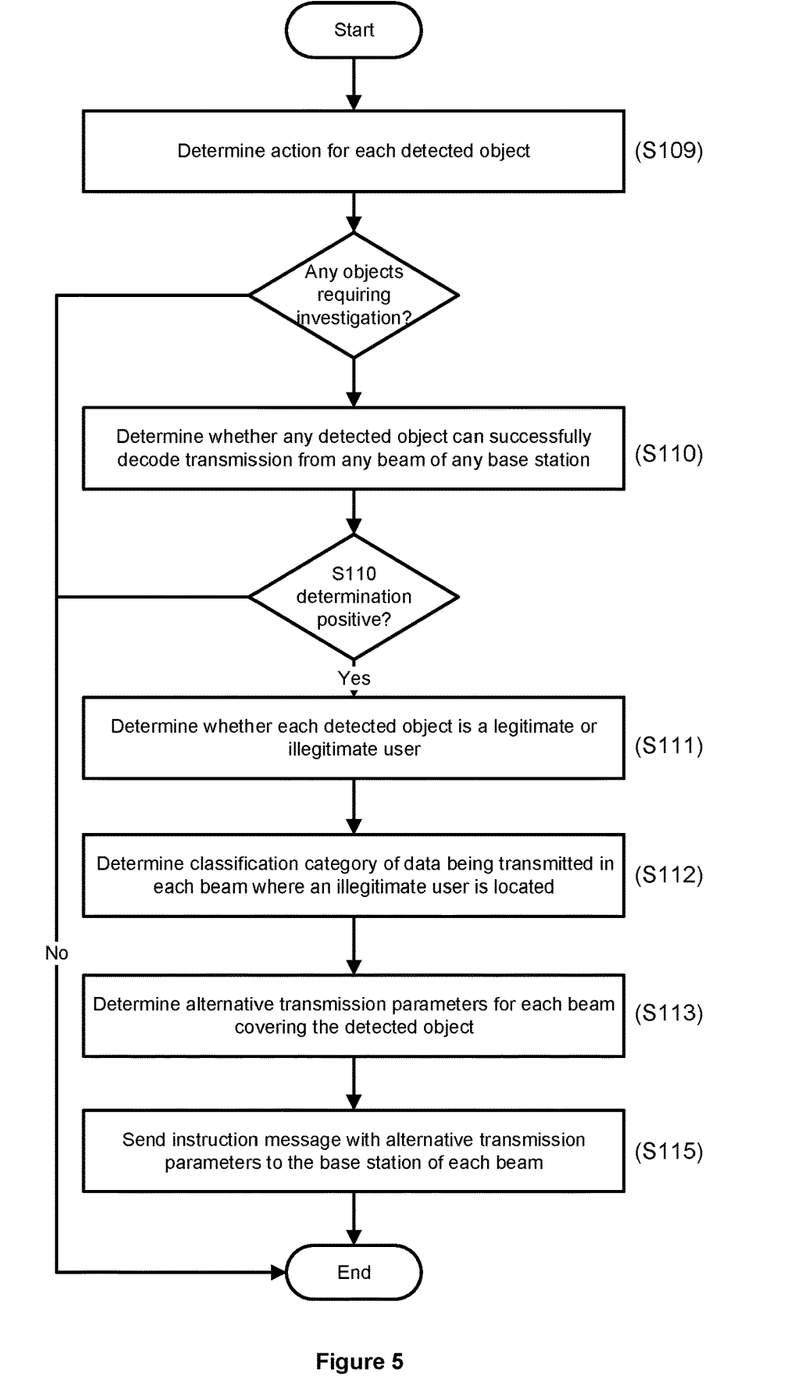
FIG. 5 is a flow diagram of a process implemented by the beam management node in the first embodiment of the method of the present disclosure.

Turning to FIG. 5, at S109, the beam management node 50 receives the extracted image portion of each detected object and inputs each extracted image portion to the inference agent 53b. The inference agent 53b uses its trained classification model to output an object type identifier and an action identifier for that object. In this example in which the image includes two detected objects—the legitimate UE 60 and the UAV—the inference agent 53b outputs an object type identifier for the legitimate UE 60 as "User Equipment" and corresponding action identifier "Investigate", and further outputs an object identifier for the UAV as "UAV" and corresponding action identifier "Investigate". If there are no objects requiring further investigation, then the process ends or loops back to S101.

At S110, the beam management node 50 determines, for each detected object requiring further investigation, whether the detected object is able to successfully decode a transmission from any beam of the first and/or second base station (in other words, whether it is positioned within one or more beams of the first and/or second base station 10, 20). This may be achieved via several methods:

1) the beam management node 50 receives update messages identifying the coverage area of each beam of the first and second base station 10, 20 (within which the signal strength of a transmission from the transmitting base station is above a minimum signal strength threshold required for successful reception by a receiving node). The coverage area of each beam may be reported to the beam management node 50 as an explicit indication of the geographical area (e.g. a set of GPS coordinates defining a boundary line of the coverage area);

2) the beam management node 50 may receive transmission parameters for each beam of the first and second base stations (e.g. transmit power, antenna angle, etc.) and estimate the signal strength of a transmission from the transmitting node and the location of the detected object.

If none of the detected objects can successfully decode a transmission from any beam of either the first or second base station (that is, they are all located outside all coverage areas of all beams of the first and second base station 10, 20) then the process ends or loops back to S101. If one or more detected objects can successfully decode a transmission from any beam of either the first or second base station, then the process proceeds to S111. In this example, both detected objects are able to decode transmissions of the first beam of the first base station 10.

In S111, the beam management node 50 determines whether each detected object (that can successfully decode a transmission of a beam of either the first or second base station, as determined in S110) is a legitimate user or an illegitimate user. In this embodiment, this is achieved by receiving periodic location reports from all users of all base stations and performing a matching operation between the location of the detected object (sent to the beam management node 50 in S107) and the location of the user in the periodic location report. If there is a match, then the detected object is deemed a legitimate user. If not (that is, the location of the detected objection from S107 does not match any location of any user of the periodic location reports), then the detected object is deemed an illegitimate user. If all detected objects are deemed legitimate users, then the process ends or loops back to S101. If at least one detected object is deemed an illegitimate user, then the process continues to S112. In this example, the legitimate UE 60 is deemed a legitimate user and the UAV is deemed an illegitimate user.

In S112, the beam management node 50 determines the classification category of the data being transmitted in each beam where an illegitimate user is located (the first beam of the first base station 10 in this example). This may be achieved by request-response messaging with the base station transmitting each beam. If the data being transmitted is not sensitive, then the process ends or loops back to S101. If the data is sensitive, then the process proceeds to S113. In this example, the data transmitted in the first beam of the first base station 10 is sensitive.

In S113, the beam management node 50 determines alternative parameters for each beam that contains an illegitimate user and is transmitting sensitive information (determined at S110 to S112—the first beam of the first base station 10 in this example). These alternative parameters are determined so that the illegitimate UE cannot successfully receive a transmission from the beam. In this embodiment, this is implemented by reducing the signal strength of transmissions of that beam are below (such as by a configurable factor) the minimum signal strength threshold required for successful reception by a receiving node at the location of the illegitimate user. In this example, the alternative parameter is the transmission power, so that only the range of the beam is reduced.

At S115, the beam management node 50 sends an instruction message to each base station of each beam identified in S110, instructing the base station to implement the alternative transmission parameters determined for the identified beam. Turning to FIG. 6, at S117, each base station determines whether there are any legitimate UE (such as the first legitimate UE 60) that would receive poor or no service following implementation of the alternative transmission parameters. If so, then the process continues to S119. In this example, the first base station 10 determines that there are no UE that would receive poor or no service following implementation of the alternative transmission parameters, so the process continues to S121.

In S121, each base station implements the alternative transmission parameters. In this example, the first base station 10 implements the alternative transmission parameters so as to reduce the transmission power of the antenna that transmits the first beam (or of the plurality of antennas that cooperate to transmit the first beam) so that the coverage area of the first beam no longer covers the illegitimate user (or, in other words, so that the signal strength of the first beam at the location of the illegitimate user is less than the minimum signal strength required to successfully decode a transmission of the first beam). The state of the network following this reconfiguration is shown in FIG. 7. FIG. 7 also illustrates the first legitimate UE 60 remaining within the first beam of the first base station 10, such that it may continue to successfully receive transmissions of the first beam following the reconfiguration.

Figure 8:
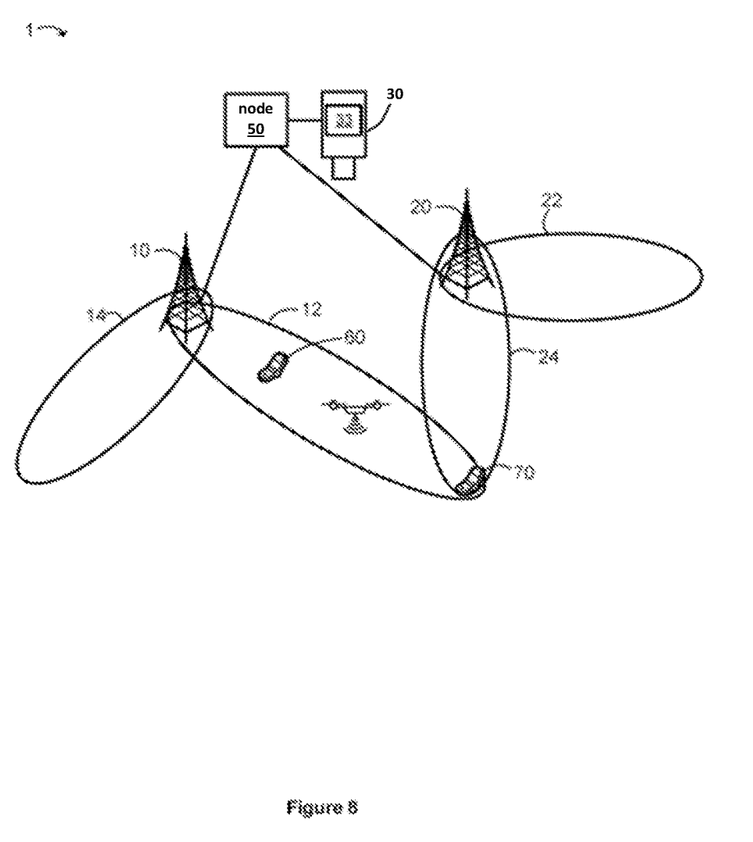
FIG. 8 is a schematic diagram of a cellular telecommunications network of an enhancement to the first embodiment of the present disclosure, in a first state.
Figure 9:
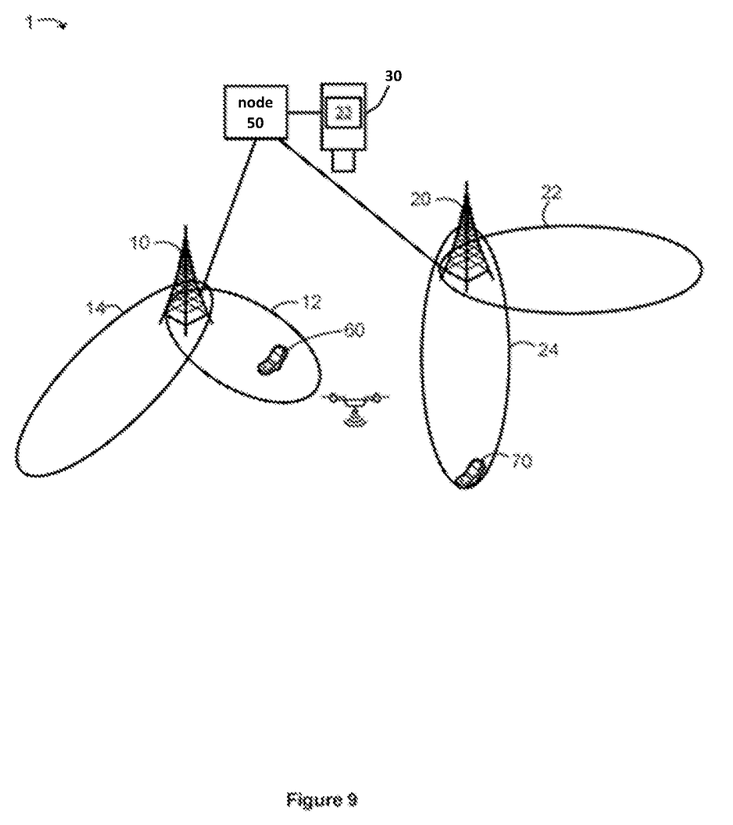
FIG. 9 is a schematic diagram of the network of FIG. 9 in a second state.

An enhancement to the above embodiment will now be described with reference to FIGS. 8 and 9, which illustrate a network prior to reconfiguration and following reconfiguration respectively. The network includes both a first legitimate UE 60 and second legitimate UE 70 that are both connected to the first beam 12 prior to the reconfiguration. As in the embodiment above, the first legitimate UE 60 is positioned between the illegitimate user and the first base station 10. However, the second legitimate UE is positioned further away from the first base station 10 than the illegitimate user, such that, following the reconfiguration at S121, the second legitimate UE 70 would be outside the coverage area of the first beam. The reconfiguration would cause the radio link between the second legitimate UE and the first base station 10 to fail so, to avoid this, at S119 (as shown in FIG. 6), the first base station 10 initiates a transfer of the second legitimate UE 70 to a neighboring base station. In this embodiment, this is achieved by instructing the second legitimate UE 70 to prepare and report measurements of its neighboring base stations. The first base station 10 reviews this report and determines that the second base station 20 is a target base station for a handover of the second legitimate UE and therefore sends a handover request to the second base station 20. If the second base station 20 accepts the handover request (which should be based on its state following any reconfiguration instructed by the beam management node 50), then the second legitimate UE is transferred to the second base station 20. The second legitimate UE may also be transferred by a cell reselection process.

The skilled person will understand that there are other parameters, other than transmission power, that may be changed so that, following the reconfiguration, the illegitimate user can no longer successfully receive transmissions. These may be, for example, the angle of the beam or the shape of the beam. Furthermore, the change in angle/shape of the beam may be so as to provide coverage for all legitimate users, but no coverage for illegitimate users, so as to provide continuity of service without having to transfer any legitimate user to another access point. The parameter may also include, additionally or alternatively to a change in the transmission parameters of the beam, the use of an encryption method or switch to a more secure encryption method, such as switching from Advanced Encryption Standard (AES)-128 to AES-192 or AES-256 (such that the coverage area of the beam does not change, but an encryption method in the coverage area is made more secure).

In a further enhancement to the above embodiment, the beam management node 50 may track the location of the UAV (e.g. by instructing the optical camera 30 to track the UAV and periodically report its location), and take pre-emptive action to adjust the coverage area of any beam/base station that the UAV is an illegitimate user of so that the UAV does not receive service or is able to receive from any beam/base station. The beam management node 50 may also instruct other optical cameras to track the UAV if, for example, the UAV moves out of view of the optical camera 30. This function may be limited to objects having a particular action identifier, such as "Investigate and Monitor".

The skilled person will understand that the above embodiment applies to any form of wireless telecommunications network, such as a wireless local area network or wireless wide area network.

The skilled person will also understand that it is non-essential for the beam management node 50 to further investigate whether an object is legitimate or not. That is, the beam management node 50 may classify a particular object type (e.g. UAV) as illegitimate in all circumstances and therefore skip S111. In the above embodiments, the beam management node 50 determines whether the UE is a legitimate UE or an illegitimate UE based on a comparison of its location with the locations of all known legitimate users. The skilled person will understand that this test may be implemented in other ways, such as a comparison of the image of the UAV under investigation with images of known legitimate UAVs and/or known illegitimate UAVs.

Furthermore, the skilled person will understand that it is non-essential for the beam management node 50 to determine whether the information being transmitted by a beam is sensitive or not. This may be skipped so as to always take responsive action to in response to detecting an illegitimate user.

In the above embodiments, the beam management node 50 is a core networking node. However, this is non-essential. For example, the beam management node may be a module of a Radio Access Node (RAN) Intelligent Controller (RIC).

In the above embodiment, an optical camera is used to detect an object in the coverage area of a base station. However, this is non-essential, and any other suitable sensor for detecting an object and estimating the location of the object may be used (such as a LIDAR sensor).

The skilled person will understand that any combination of features is possible within the scope of the disclosure, as claimed.

The invention claimed is:

1. A method of operating a network node in a wireless telecommunications network, wherein the wireless telecommunications network includes a first access point having a first transmitter having a first coverage area, wherein the first access point serves a legitimate User Equipment (UE), the method comprising:
   receiving, from a sensor, data indicative of an object within the first coverage area of the first transmitter of the first access point, the data identifying a location of the object within the first coverage area of the first transmitter of the first access point;
   determining, from the data, that the object is an illegitimate user; and, in response,
   causing a modification of the first access point so that the object cannot successfully receive a transmission from the first transmitter by reducing a value of signal strength of the transmission from the first transmitter at the location of the object to below a signal strength threshold representing a minimum signal strength required to successfully receive the transmission from the first transmitter; and
   continuing service to the legitimate UE by causing a transfer of the legitimate UE to a second transmitter in the wireless telecommunications network.

2. The method as claimed in claim 1, wherein causing the modification of the first access point also includes one of:
   implementing an encryption technique for the transmission from the first transmitter, or
   switching to a more secure encryption technique for the transmission from the first transmitter.

3. The method as claimed in claim 1, further comprising monitoring the location of the object, wherein receiving data indicative of the object is part of the monitoring.

4. The method as claimed in claim 1, wherein the object is an Unmanned Vehicle (UV).

5. The method as claimed in claim 4, wherein the object is an Unmanned Aerial Vehicle (UAV).

6. A system comprising:
   at least one processor and memory storing instructions which, when the instructions are executed by the at least one processor, cause the at least one processor to carry out the method of claim 1.

7. A non-transitory computer readable storage medium comprising instructions which, when executed by a computer system, cause the computer system to carry out the method of claim 1.

8. A node for a wireless telecommunications network having a transceiver, memory and a processor configured to cooperate to implement the method of claim 1.

9. A method of operating a network node in a wireless telecommunications network, wherein the wireless telecommunications network includes a first access point having a first transmitter having a first coverage area, the method comprising:
   receiving, from a sensor, data indicative of an object within the first coverage area of the first transmitter of the first access point;
   determining, from the data, that the object is an illegitimate user; and, in response,
   causing a modification of the first access point to implement one of:
      an encryption technique for a transmission from the first transmitter, or
      to switch to a more secure encryption technique for the transmission from the first transmitter.

10. The method as claimed in claim 9, further comprising monitoring a location of the object, wherein receiving data indicative of the object is part of the monitoring.

11. The method as claimed in claim 9, wherein the object is an Unmanned Vehicle (UV).

12. The method as claimed in claim 11, wherein the object is an Unmanned Aerial Vehicle (UAV).

\* \* \* \* \*